United States Patent Office 2,951,047
Patented Aug. 30, 1960

2,951,047
PREPARATION OF FILAMENTS FROM POLYTET-
RAFLUOROETHYLENE EMULSIONS

Peter Richard Lantos, Kennett Square, Pa., assignor to
E. I. du Pont de Nemours and Company, Wilmington,
Del., a corporation of Delaware No Drawing. Filed Dec. 24, 1956, Ser. No. 630,072

1 Claim. (Cl. 260—17)

The present invention relates to the formation of films, fibers and the like from tetrafluoroethylene polymers. Specifically the invention is directed to a process of making continuous structures from an aqueous polytetrafluoroethylene dispersion which is emulsified in a water-immiscible organic solvent containing an organic polymer.

Throughout the description of this invention, the term "dispersion" will be understood to designate an intimate suspension of finely-divided solid particles in a liquid, whereas the term "emulsion" will be applied only to indicate suspensions of finely-divided liquid droplets in another liquid.

A fiber having the desirable properties of polytetrafluoroethylene, e.g., chemical inertness, high temperature stability, non-adhesiveness, low modulus, low wettability with water and organic liquids, low coefficient of friction and unique electrical properties, has promising utility for many industrial purposes. However, the chemical inertness of polytetrafluoroethylene (apparent from its low solubility) and its high temperature stability (apparent from its high melting point) have made the processing of this polymer difficult. It is therefore obvious that polytetrafluoroethylene cannot be spun into fibers by conventional spinning methods, e.g., by wet or dry spinning from solution or by melt extrusion. A newer method involving the spinning of polytetrafluoroethylene in the form of a lubricated paste, requires enormous pressures, and yields only coarse fibers of uneven denier and extremely low strength, before the required sintering involved in the making of the final product; the high pressure, the unadaptability of the polymer to the spinning of multi-filament yarns composed of low denier fibers, and the inability to use the continuous process in the application of the lubricated paste method impose serious limitations on the use of this process. Other known techniques for forming continuous structures of polytetrafluoroethylene have resulted in very weak filaments of no practical value; the filaments were not well formed and their weakness before they were subjected to the sintering step prevented their handling by conventional methods. An approach to the problem of the dry spinning of polytetrafluoroethylene dispersions by transferring the aqueous polytetrafluoroethylene dispersion into an organic liquid has hitherto been unsuccessful; this attempt resulted in the formation of a coagulated non-filterable paste which could not be diluted with additional dispersant.

It is, accordingly, an object of the present invention to make useful shaped articles, particularly fibers and film, from tetrafluoroethylene polymers. A further object is to provide new compositions of matter for use in the preparation of shaped articles from tetrafluoroethylene polymers. A still further object is to provide a process for making strong textile filaments from tetrafluoroethylene polymers. Other objects will appear hereinafter.

These and other objects are accomplished by emulsifying an aqueous dispersion of polytetrafluoroethylene in a solution of a different polymer serving as a matrix in an organic solvent substantially immiscible in water. Such a mixture can properly be considered a water-in-oil type emulsion of the following four components: water, a water-immiscible organic solvent, polytetrafluoroethylene, and the matrix polymer. This emulsion contains therefore, in colloidally distributed form, the dispersion of the polytetrafluoroethylene in water, the organic solvent being the continuous phase and the aqueous dispersion being the disperse phase of the emulsion.

This emulsion dispersion comprises a colloidally dispersed, water-containing spinnable tetrafluoroethylene polymer composition in contact to compositions which are water free but are invariably coagulated. The combined water-organic solvent system has permitted the use of polymers as a matrix for the polytetrafluoroethylene not possible in a dispersion of polytetrafluoroethylene alone. In particular, this emulsion dispersion makes possible the use of polytetrafluoroethylene in dry spinning and in wet spinning processes.

The production of film or fibers from this emulsion of polytetrafluoroethylene in accordance with the present invention involves the following steps: extrusion of the emulsion through a conventional spinning orifice or orifices, e.g., a spinneret, into a setting medium for the matrix material, sintering of the contained polytetrafluoroethylene at a temperature above its crystalline melting temperature (327° C.), and elimination of the matrix material if necessary or desired. The step of eliminating the matrix material will not in most cases have to be carried out as a separate step, depending on the selection of matrix material, since, at the sintering temperature of polytetrafluoroethylene, most matrices will decompose into volatile and hence readily removable materials, e.g., monomers, gases of decomposition, or low molecular polymers which will flash out.

The strength of the fibers or film during spinning is due, in large part, to the matrix polymer which coagulates and coalesces after being extruded through the spinneret, thereby enveloping therein discrete particles of the insoluble, unmelted polytetrafluoroethylene.

As a setting medium for the matrix polymer, air (for dry spinning) or methanol (for wet spinning) have been found satisfactory; although equivalent gaseous and liquid coagulants may be used.

For the purpose of making the emulsion/dispersion smooth and stable, one to four percent by weight of the combined weight of liquids of the emulsion/dispersion, of a surfactant, i.e., surface-active agent, is added to the above four-component system. Illustrations of these surface-active agents, which are agents for forming the water-in-oil type of emulsion, will be found in the examples and the discussion following the examples.

The invention will be more clearly understood by reference to the examples and the discussion which follows the examples. These examples are given for illustration only and are not limitative; parts, proportions and percentages are by weight throughout the examples and specification unless otherwise indicated.

*Example I*

To 500 grams of a 25% solution of polystyrene (molecular weight 100,000) in toluene containing 2% of a surface-active agent, sold under the trade name "Span 20" and believed to be sorbitan monolaurate, was added 625 grams of a 60% dispersion of polytetrafluoroethylene (molecular weight 1,000,000) in water. This gave a 3:1 ratio of polytetrafluoroethylene/polystyrene. The dispersion of polytetrafluoroethylene (average particle size 0.2 microns) was prepared by the method described in Kroll, U.S. Patent No. 2,750,350, issued June 12, 1956, with the addition of a compound sold under the tradename "Triton X–100" and believed to be an alkaryl polyether alcohol formed by condensing 10 moles of ethylene oxide per mole of alkphenol, as a dispersant, followed by concentration (through evaporation) of the dispersion. The emulsion/dispersion was spun through a 5-hole spinneret, the holes being 0.008 inch in diameter, into warm (55° C.) methanol. Fine fibers were obtained having a strength quite adequate for winding up after passing from the methanol bath. The fibers were then sintered by passage over and in contact with a hot plate at 370° C. with the production of fibers of satisfactory tenacity. The same composition was also cast into a tough film by pouring on a steel plate, followed by air drying without sintering.

Example II

An emulsion/dispersion of polytetrafluoroethylene was prepared by dissolving 10 g. polyisobutylene (molecular weight 250,000) in 90 grams toluene, adding 2 grams of the "Span 20" surface-active agent, and then 100 grams of the aqueous 60% polytetrafluoroethylene dispersion of Example I. After stirring for one minute, this mixture was spun through a 5-hole spinneret (0.008-inch diameter holes) at the speed of 60 feet per minute into a bath containing methanol at 55° C. with a 2-foot bath travel. The yarn was wound up on a bobbin and sintered by passage over and in contact with a hot plate at 380° C. to obtain yarn having good strength.

Example III 30 grams polystyrene (molecular weight 100,000) were dissolved in 120 grams toluene. To this was added 2 grams of a cationic surface-active agent comprising a mixture of tertiary amines, each tertiary amine having one alkyl group and two polyoxyethylene groups attached to each nitrogen; in the mixture of tertiary amines, the alkyl group consisting of octyl (8%), decyl (9%), lauryl (47%), myristyl (18%), palmityl (8%), stearyl (5%) and oleyl (5%); sold under the trade name "Ethomeen 18/15", and 150 grams of the 60% aqueous polytetrafluoroethylene dispersion of Example I to give a ratio of 3 parts of the intractable polytetrafluoroethylene to one part of matrix material. After stirring, a smooth emulsion/dispersion, dilutable with toluene, was formed. This was dry-spun through a 3-hole spinneret of 0.008-inch orifice diameter into a hot air spinning cell at a spinning head temperature of 80° C. and a spinning cell temperature of 150° C. The fibers were self-supporting for 8 feet of their length and were thereafter sintered at 375° C. to a brownish filament. A film, cast from the same mixture was strong and flexible when dry and was sintered at 380° C. over two rollers to a very light-colored tough product.

This experiment of Example III above was repeated with different surfactants in place of that of Example III, such as phosphates of long-chain alcohols marketed under the trade name "Ortholeum 162," sorbitan monooleate marketed under the trade name "Span 80," a non-ionic surface-active agent prepared by condensing ethylene oxide with a hydrophobic base formed by the condensation of propylene oxide with propylene glycol, the molecular weight of polyoxyethylene chain being in the range 1500–1800 and the polyoxyethylene comprising 40% of the total weight marketed under the trade name "Pluronic L–64," and in another modification, using 4% "Span 80" surfactant and the 60% aqueous polytetrafluoroethylene dispersion stabilized with "Triton X–100" surfactant. In all these experiments water-in-oil type emulsion/dispersions were obtained, all of which were substantially equally capable of being shaped into the desired form.

Example IV 300 grams toluene containing 23% polystyrene (molecular weight 100,000) and 2 grams "Ethomeen 18/15" surfactant were deaerated. To this solution was added 150 grams of an aqueous 30% polytetrafluoroethylene (molecular weight 1,000,000) dispersion prepared as in Example I, and the mixture stirred. It was then spun into monofilaments through a 15 mil hole spinneret into a hot air dry spinning column the filaments being separately collected. The head temperature of this spinneret was 80° C., the cell wall temperature being 150° C. The product could be subsequently sintered at a high temperature in the manner indicated in the preceding examples.

Example V

When the experiment of Example I was repeated by replacing the "Span 20" surfactant by an equal amount of a cationic surface-active agent comprising a mixture of tertiary amines, each tertiary amine having one alkyl group and two polyoxyethylene groups attached to each nitrogen; in the mixture of tertiary amines the alkyl groups consisting of palmityl (6%), stearyl (93%) and oleyl (1%) product sold under the trade name "Ethomeen C 15" as a surfactant, an equally well shapable water-in-oil type emulsion/dispersion was obtained which may be used to produce equally satisfactory filaments.

While the production of the tetrafluoroethylene polymer dispersions is not a part of the present invention, they may be prepared to any suitable process described in the prior art, for example, according to the procedures of Llewellyn and Lontz, U.S. Patent No. 2,685,707, issued August 10, 1954; Berry, U.S. Patent No. 2,559,750, issued July 10, 1951; Renfrew, U.S. Patent No. 2,534,058, issued December 12, 1950 or Berry, U.S. Patent No. 2,478,229, issued August 9, 1949.

While the particle size of the tetrafluoroethylene polymer in a dispersion may vary over a wide range it is preferred that the polymer particles be of a size sufficiently small to pass through the holes of a spinneret; normally a polymer, the particles of which are included within the range of 0.05 to 5 microns and preferably within the range of 0.1 to 2 microns, is suitable for the practice of the invention.

Generally, it can be said that polytetrafluoroethylene dispersions can be emulsified in various polymer solutions, provided the organic solvent is substantially immiscible with water. These emulsions contain colloidal particles of unagglomerated polytetrafluoroethylene, and may readily be diluted as desired by the same or other water-immiscible organic solvent.

The following surfactants for the emulsification step have been found useful: the surface-active agents sold under the trade names "Ethomeen 18/15," "Ethomeen C 15," "Span 20," "Span 80," "Pluronic L–64," and "Ortholeum 162." The emulsions are generally prepared by dissolving 0.1–10%, preferably 0.5–5% of the surfactant together with the matrix polymer in the organic solvent, then adding the aqueous polytetrafluoroethylene dispersion and stirring till emulsified. This stirring must be vigorous enough to affect emulsification, but should preferably not shear the polytetrafluoroethylene nor beat air into the emulsion. It is a surprising characteristic of the present invention that these surfactants promote the desired water-in-oil type emulsion.

As can be seen from the above examples, complete coalescence of the polymer particles is achieved by sintering. Development of optimum mechanical properties is dependent in part upon the sintering conditions, since incomplete sintering results in weak spots with attendant poor mechanical properties. The optimum sintering temperature for the developing of maximum properties appears to be approximately 350 to 400° C. At this temperature, yarns have to be sintered about 7 seconds before maximum physical properties can be developed.

While higher sintering temperatures naturally require shorter sintering times, and sintering temperatures up to 430° C. have been used successfully, the contact times at temperatures below about 375° C. required to develop maximum properties become excessive. Many suitable heating media, such as molten salt or metal baths, heated rolls or plates, hot air, or radiant heat may be used for the sintering step.

Suitable tensile properties for commercial applications are obtained by drawing the filaments after sintering, preferably at temperatures between the melting point and the decomposition temperature of the tetrafluoroethylene polymer. When sintering and drawing are combined into a single operation, temperatures of approximately 400° C. represent about the best balance between sintering rate, drawability, decomposition, and the yarn properties. Where drawing is performed as a separate operation from sintering, it is preferably carried out at temperatures between 330° C. and 400° C.

The invention has been described particularly in terms of tetrafluoroethylene homopolymer, also called polytetrafluoroethylene, made in the absence of materials copolymerizable with tetrafluoroethylene, and it is the preferred polymer for use in this process. However, the invention also applies to other polyhalogenated polymers. For example, copolymers of tetrafluoroethylene with other unsaturated organic compounds, such as ethylene, perfluoropropylene and chlorotrifluoroethylene may be used. The copolymerizable modifier may be present in the copolymer up to about 15% of the polymer and still maintain the essential properties of the tetrafluoroethylene homopolymer. Telomerized tetrafluoroethylene polymers in which the end groups of the polymer chain are supplied by non-polymerizable compounds (e.g., methanol and ethanol) present during the polymerization to terminate polymerization at the desired molecular weight, may also be used.

The tetrafluoroethylene polymer can vary widely as to molecular weight. Generally speaking, the preferred molecular weights for the tetrafluoroethylene polymer are 8,000 or higher.

A great deal of water in the emulsion/dispersion complicates the spinning process. A total solids content of over 25% of the combined weight of the emulsion/dispersion components has been found satisfactory. The preferred total solids content, however, is above about 30%, since dispersions of this or higher concentrations can easily be dry spun, while dispersions containing from about 20 to 30% solids are preferably wet spun. In wet-spinning a lower percentage of solids is required, as the setting medium chosen is a solvent for the organic, water-immiscible solvent, thus concentrating the solids of the extruded mixture with a solidification of the matrix polymer containing embodied therein discrete particles of the intractable polymer.

Another important condition concerns the composition of the solids in the emulsion/dispersion. The ratio of polytetrafluoroethylene/matrix polymer may range from 1:2 to 10:1, with the preferred range being from 2:1 to 8:1. Too low a polytetrafluoroethylene content yields poor fibers after sintering. At higher ratios the emulsion tends to invert or becomes unspinnable. A high ratio of polytetrafluoroethylene dispersion to matrix solution can be readily attained by the addition of a sufficient amount of the above-specified surfactants.

Matrix materials useful in practicing the present invention are all those polymers which are substantially water-insoluble but are soluble in an organic, water-immiscible solvent. The preferred matrix materials for practicing the present invention have a decomposition temperature below 300° C. and flash off at such a temperature without leaving charred remains. Examples of useful matrix materials are polystyrene, polyisobutylene, polyvinyl toluene, nitrocellulose, polyethyene, or copolymers like a butadiene/styrene copolymer. Some of these matrix materials are even available in their solution form in an organic water-immiscible solvent. These matrix materials are generally characterized by their ability to deposit a coherent, homogeneous, self-sustaining film from solution and after removal of the solvent. They are present in the organic solvent in the amount of 1% to 10% by weight of the total weight of matrix and solvent, the preferred range being from 2% to 8%.

Among the organic solvents useful in practicing this invention are heptane, toluene, carbon tetrachloride, chloroform, benzene, liquid aliphatic hydrocarbons or their halogen derivatives, water-immiscible ethers, water-immiscible esters or ketones, nitrobenzene, chlorobenzene, the xylenes, etc. These solvents are substantially immiscible with water since their solubility in water is small and the bulk of this solvent is undissolved in the water of the emulsion/dispersion.

The new compositions of matter of the present invention are clearly distinguished from the formerly known dispersion spinning mixtures. In the case of these new compositions, water-insoluble organic polymers can be used as matrix materials. Many of these matrix materials, in contrast to water-soluble polymers, revert to volatile materials at sintering temperatures of polytetrafluoroethylene; such a matrix material has the valuable and desired characteristic of flashing off during sintering without leaving any charred remains, thus yielding a white polytetrafluoroethylene structure which cannot be obtained by using polymeric water-soluble matrices. The continuous phase in these compositions is the organic solvent, which means that emulsions made up with a given amount of solvent may be diluted with organic solvent at any time to any desired extent. These compositions can be kept for months and no agglomeration occurs; they are fiber forming with about the same ease as a cellulose acetate spindope, and they are readily dry spun. Dry spinning is more easily carried out when the water content of the emulsion is held to a minimum.

Any departure from the above description which conforms to the present invention is also intended to be included within the scope of the claim.

I claim:

The process which comprises commingling an aqueous dispersion consisting essentially of water, polytetrafluoroethylene particles of a size between about 0.05 and about 5 microns and a dispersing agent with a solution in a water-immiscible organic liquid selected from the group consisting of heptane, toluene, carbon tetrachloride, chloroform, benzene, nitrobenzene, and chlorobenzene, of a water-immiscible film-forming polymer selected from the group consisting of polystyrene, polyisobutylene, polyvinyl toluene, nitrocellulose, polyethylene, and butadienestyrene copolymers; thoroughly agitating the resulting mixture in the presence of from about 0.1 to about 10% of a water-in-oil emulsifier for this system selected from the group consisting of a cationic surface-active agent comprising a mixture of tertiary amines, each tertiary amine having one alkyl group and two polyoxyethylene groups attached to each nitrogen, in the mixture of tertiary amines, the alkyl groups consisting of octyl (8%), decyl (9%), lauryl (47%), myristyl (18%), palmityl (8%), stearyl (5%) and oleyl (5%); a cationic surface-active agent comprising a mixture of tertiary amines, each tertiary amine having one alkyl group and two polyoxyethylene groups attached to each nitrogen, in the mixture of tertiary amines, the alkyl groups consisting of palmityl (6%), stearyl (93%) and oleyl (1%); a non-ionic surface-active agent prepared by condensing ethylene oxide with a hydrophobic base formed by the condensation of propylene oxide with propylene glycol, the molecular weight of polyoxyethylene chain being in the range 1500–1800 and the polyoxyethylene comprising 40% of the total weight; sorbitan monolaurate; and sorbitan monooleate; to form a water-in-oil emulsion, the ratio of polytetrafluorethylene to film-forming polymer being from about 1:2 to about 10:1 and extruding the resulting emulsion into filaments.

References Cited in the file of this patent

UNITED STATES PATENTS

| | | |
|---|---|---|
| 2,530,362 | Morris | Nov. 14, 1950 |
| 2,668,157 | Emig et al. | Feb. 2, 1954 |
| 2,671,065 | Ulrich | Mar. 2, 1954 |
| 2,681,324 | Hochberg | June 15, 1954 |
| 2,718,452 | Lontz | Sept. 20, 1955 |
| 2,737,436 | Le Boeuf | Mar. 6, 1956 |
| 2,766,214 | Erchak et al. | Oct. 9, 1956 |

FOREIGN PATENTS

| | | |
|---|---|---|
| 588,697 | Great Britain | May 30, 1947 |
| 486,628 | Canada | Sept. 16, 1952 |
| 511,376 | Canada | Mar. 29, 1955 |